(12) United States Patent
Chen

(10) Patent No.: US 6,682,284 B2
(45) Date of Patent: Jan. 27, 2004

(54) NUT HAVING LOCKING MECHANISM AND LOW OPERATING TORQUE REQUIREMENT

(75) Inventor: Ting-Kuang Chen, Keelung (TW)

(73) Assignee: Power Network Industry Co., LTD, Taoyuan (TW)

( * ) Notice: Subject to any disclaimer, the term of this patent is extended or adjusted under 35 U.S.C. 154(b) by 32 days.

(21) Appl. No.: 10/160,244

(22) Filed: Jun. 4, 2002

(65) Prior Publication Data

US 2003/0223843 A1 Dec. 4, 2003

(51) Int. Cl.[7] .............................................. F16B 37/08
(52) U.S. Cl. ..................... 411/432; 411/433; 411/917
(58) Field of Search ................... 411/432, 433, 411/917; 475/339, 346, 349; 74/650

(56) References Cited

U.S. PATENT DOCUMENTS

| | | | | |
|---|---|---|---|---|
| 4,561,324 A | * | 12/1985 | Hiramitsu et al. | 74/498 |
| 4,759,235 A | * | 7/1988 | Hiramitsu et al. | 475/339 |
| 4,955,744 A | * | 9/1990 | Barth et al. | 403/259 |
| 5,388,942 A | * | 2/1995 | Bonacina et al. | 411/432 |
| 5,518,440 A | * | 5/1996 | Bone | 451/342 |
| 5,577,872 A | * | 11/1996 | Nakamura | 411/432 |
| 5,899,648 A | * | 5/1999 | Kanaan et al. | 411/432 |
| 5,980,366 A | * | 11/1999 | Waddle et al. | 451/262 |
| 6,196,781 B1 | * | 3/2001 | Yang | 411/384 |
| 6,261,041 B1 | * | 7/2001 | Nakamura | 411/432 |
| 6,290,446 B1 | * | 9/2001 | Warkotsch et al. | 411/433 |

* cited by examiner

Primary Examiner—Flemming Saether
Assistant Examiner—Jori Schiffman
(74) Attorney, Agent, or Firm—Birch, Stewart, Kolasch & Birch, LLP

(57) ABSTRACT

A nut includes base portion forming an inner threaded bore and a first sun gear. cap forms a second sun gear of which the teeth is different from that of the first sun gear. The cap is rotatably mounted to the base with the first and second sun gears opposing and coaxial with each other. A control ring carries planetary gears engaging both the first and second sun gears. The nut secures a rotatable member of a rotary machine to a threaded driving axle. The nut is initially and loosely tightened on the axle by manually rotating the control ring. The cap has a high friction surface engaging the rotatable member. When the axle starts to rotate, a relative rotation occurs between the rotatable member and the axle which causes the cap to rotate with respect to the base. The rotation of the cap is transmitted to the base by the planetary gears to securely and completely tighten the nut. To release the nut, manual rotation of the control ring causes the base to rotate therewith in a speed reduced fashion due to the difference in teeth between the cap and the base. A small torque applied to the control ring is then converted into a large torque acting upon the base to readily loosen the nut.

15 Claims, 7 Drawing Sheets

NUT HAVING LOCKING MECHANISM AND LOW OPERATING TORQUE REQUIREMENT

FIELD OF THE INVENTION

The present invention relates generally to a nut, and in particular to a nut having a locking mechanism and requiring low operating torque.

BACKGROUND OF THE INVENTION

Nuts are widely used in the mechanical industry for securing parts of a machine, such as a grinding wheel of a grinding machine and a saw blade of a circular saw machine. The grinding wheel or the saw blade is usually secured by a nut engaging a threaded axle. When the axle rotates, it drives the grinding wheel or the same blade to rotate in unison therewith. To ensure operation safety, hand tools are commonly employed to securely tighten the nut for properly fixing the grinding wheel or the saw blade to the axle. Such an operation is quite time and labor consuming. In addition, the nut may inadvertently be not tightly secured by an absent-minded operator. Risk of damage to the operator or other properties arises with a "flying" grinding wheel or saw blade unexpectedly leaving the axle of the machine.

It is thus desired to have a nut that overcomes the above problems.

SUMMARY OF THE INVENTION

An object of the present invention is to provide a nut having a locking mechanism for securely retaining the nut on a threaded axle or bolt without unexpectedly separating from the axle or bolt.

Another object of the present invention is to provide a nut that can be loosened with a small torque.

To achieve the above objects, in accordance with the present invention, there is provided a nut comprising a base portion forming an inner threaded bore and a first sun gear. cap forms a second sun gear of which the teeth is different from that of the first sun gear. The cap is rotatably mounted to the base with the first and second sun gears opposing and coaxial with each other. A control ring carries planetary gears engaging both the first and second sun gears. The nut secures a rotatable member of a rotary machine to a threaded driving axle. The nut is initially and loosely tightened on the axle by manually rotating the control ring. The cap has a high friction surface engaging the rotatable member. When the axle starts to rotate, a relative rotation occurs between the rotatable member and the axle which causes the cap to rotate with respect to the base. The rotation of the cap is transmitted to the base by the planetary gears to securely and completely tighten the nut. To release the nut, manual rotation of the control ring causes the base to rotate therewith in a speed reduced fashion due to the difference in teeth between the cap and the base. A small torque applied to the control ring is then converted into a large torque acting upon the base to readily loosen the nut.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE INVENTION

Figure 1:
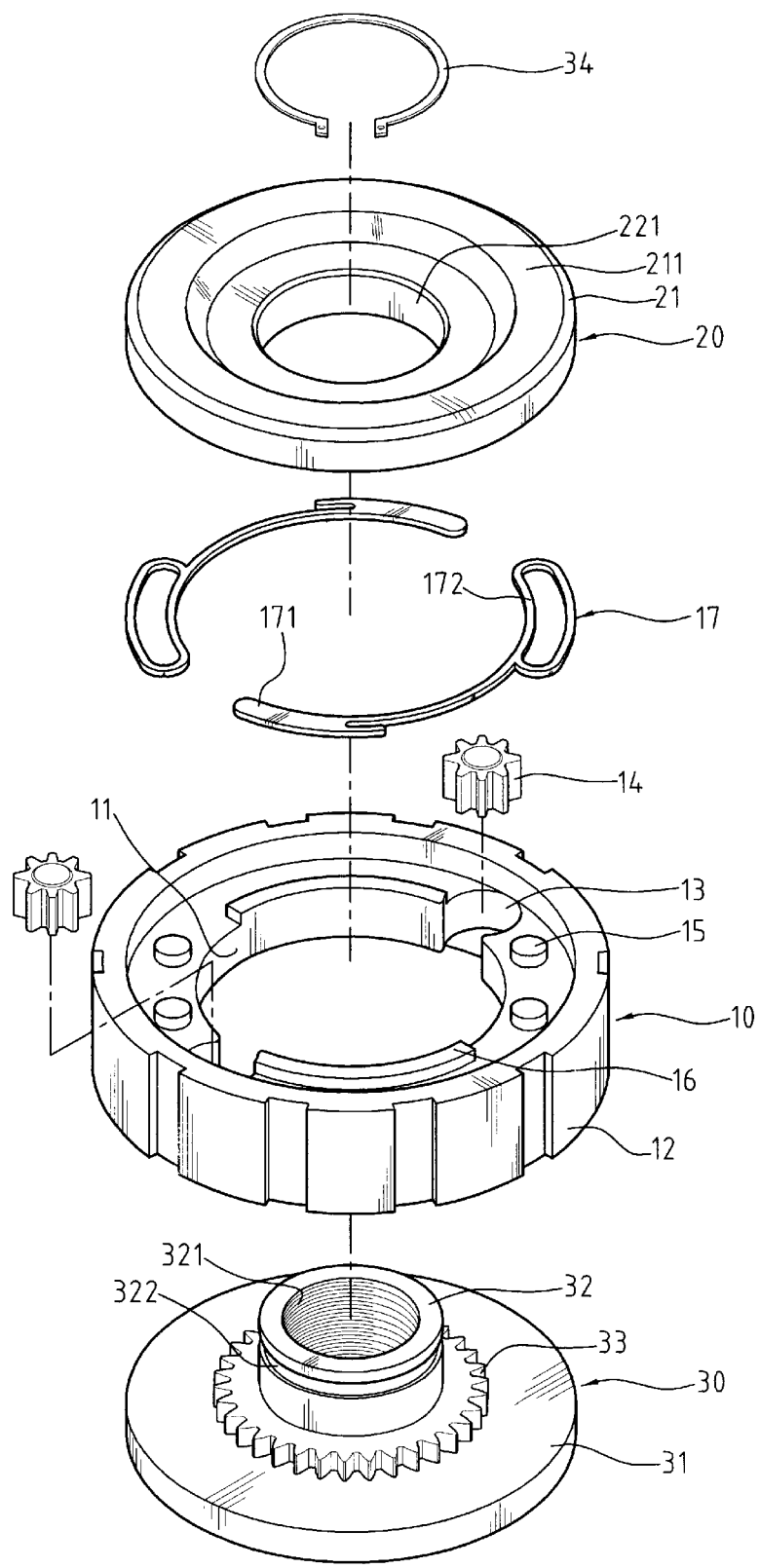
FIG. 1 is an exploded view of a nut constructed in accordance with the present invention.

With reference to the drawings and in particular to FIG. 1, a nut constructed in accordance with the present invention comprises a base 30 and a cap 20 opposite to each other and a control ring 10 movably interposed between the base 30 and the cap 20.

Figure 3A:
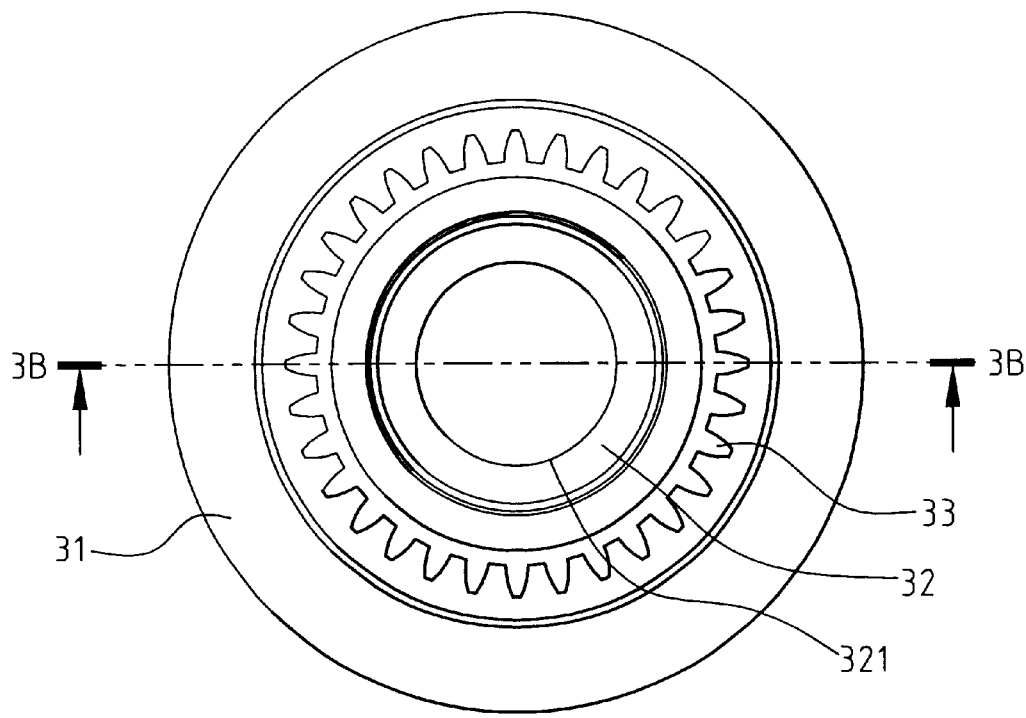
FIG. 3A is a top plan view of a base of the nut of the present invention.
Figure 3B:
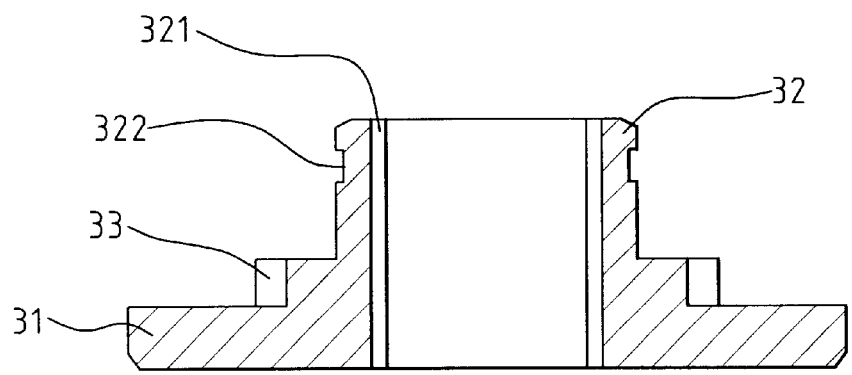
FIG. 3B is a cross-sectional view taken along line 3B—3B of FIG. 3A.
Figure 6A:
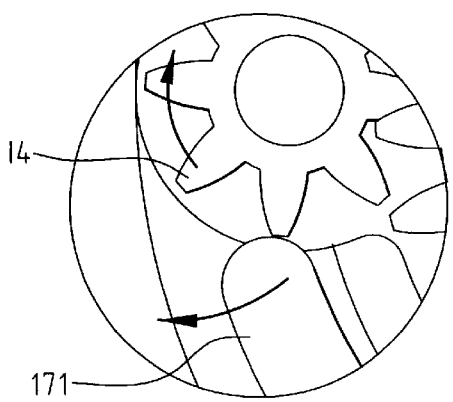
FIG. 6A is an enlarged view of encircled portion 6A of FIG. 6.
Figure 6B:
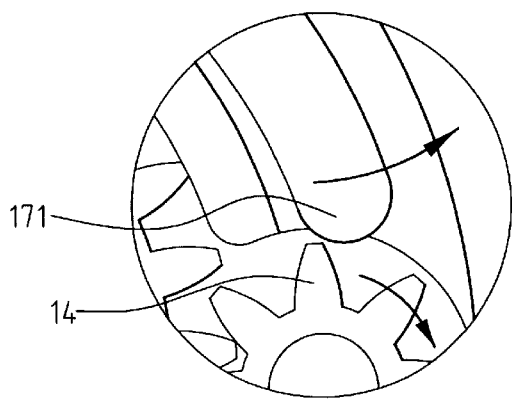
FIG. 6B is an enlarged view of encircled portion 6B of FIG. 6.
Figure 6:
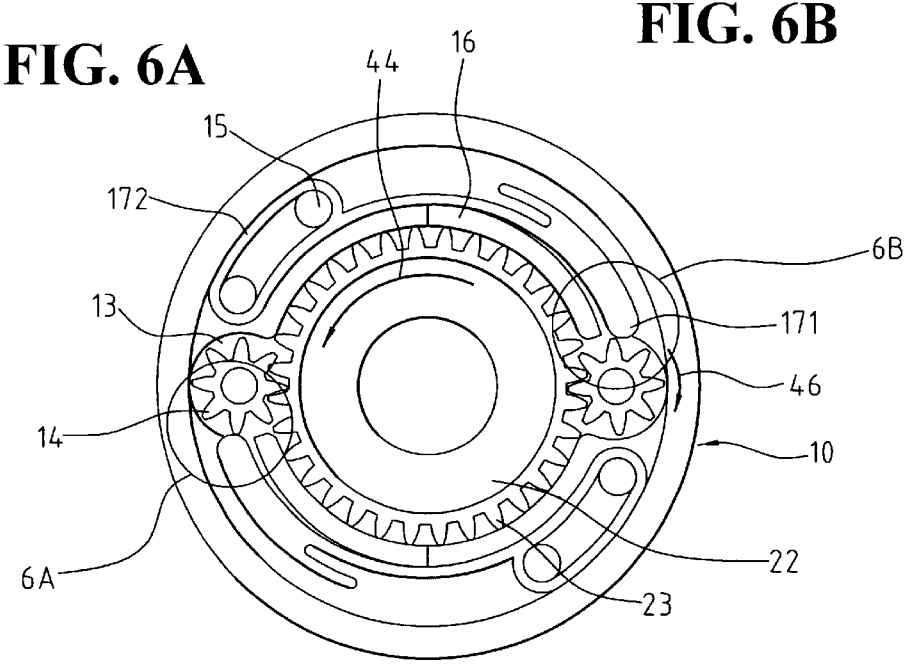
FIG. 6 is a plan view of the nut, with the cap removed, showing an advanced tightening operation of the nut when the nut is further tightened by the rotation of the cap.

Also referring to FIGS. 3A and 3B, the base 30 is made in the form of a disk 31 having a central cylinder 32 defining an inner-threaded bore 321 for threadingly engaging a threaded axle 52 of for example a grinding wheel 50 (FIG. 6). A first sun gear 33 having a first number of teeth, is formed on the disk 31 around the cylinder 32. A circumferential groove 322 is defined in the cylinder 32 at or proximal to a free end of the cylinder 32.

Figure 2A:
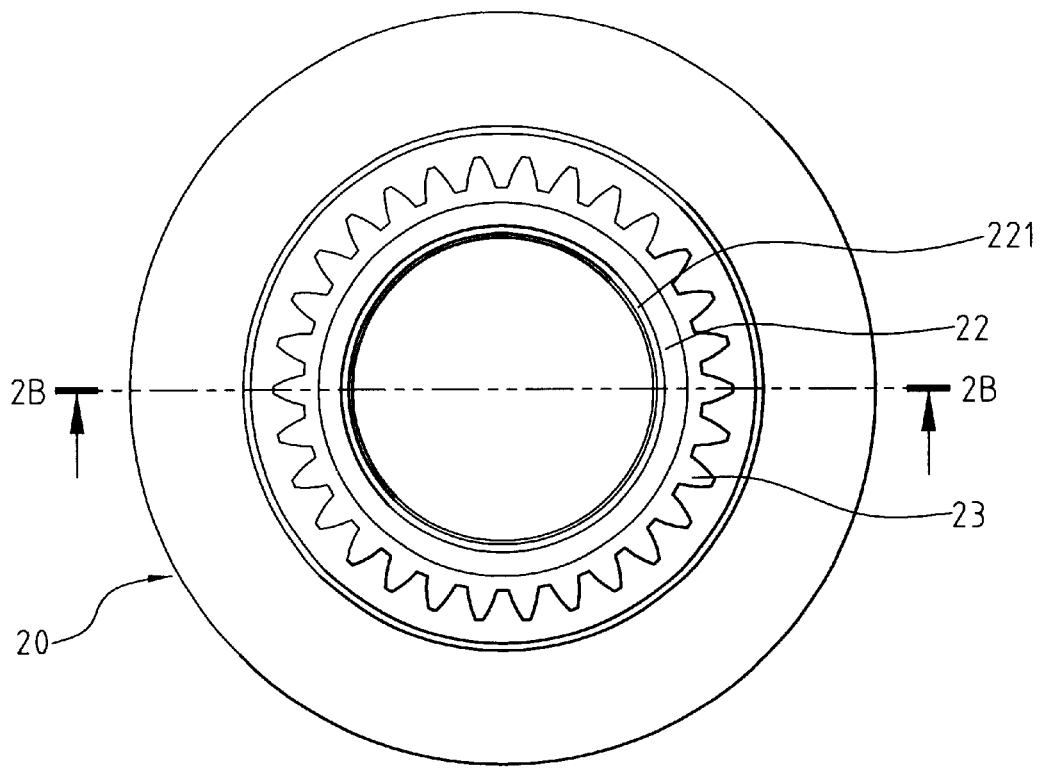
FIG. 2A is a top plan view of a cap of the nut of the present invention.
Figure 2B:
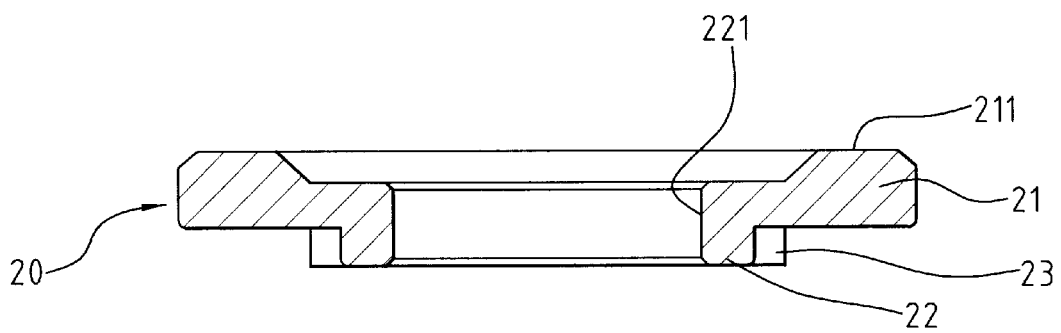
FIG. 2B is a cross-sectional view taken along line 2B—2B of FIG. 2A.

Also referring to FIGS. 2A and 2B, the cap 20 is made in the form of a disk 21 defining a central bore 221 rotatably fit over the cylinder 32 of the base 30. The disk 21 has an upper face 211 having a high friction coefficient. A concentric hub 22 is formed on an opposite lower face of the disk 21, confronting the base 30. A second sun gear 23 having a nominal diameter corresponding to the first sun gear 33 is formed around the hub 22 and thus confronting the first sun gear 33. Thus, the first and second sun gears 33, 23 are substantially coaxial with each other. The second sun gear 23 has a second number of teeth that is smaller than the first number of the teeth of the first sun gear 33. For example, the first sun gear 33 has thirty two (32) teeth, while the second sun gear 23 has thirty (30) teeth. The central bore 22 is defined through the second sun gear 23. The cylinder 32 is sized to have the free end thereof and the groove 322 extending beyond the cap 20. A C-ring 34 is fit in the groove 322 for retaining the cap 20 to the base 30.

The control ring 10 comprises an inner, circumferential flange 11 rotatably interposed between the disks 31, 21 of the base 30 and the cap 20 and an outer circumferential wall 12 surrounding the inner flange 11 and extending beyond upper and lower faces of the inner flange 11 for retaining the control ring 10 between the base 30 and the cap 20. The outer wall 12 defines a plurality of flutes (not labeled) that is spaced along the outer wall 12 for enhancing hand gripping. The upper face of the inner flange 11 defines a plurality of circular recesses 13 for each rotatably receiving and retaining a planetary gear 14 which has teeth engaging both the first and second sun gears 33, 23. Each planetary gear 14 is associated with a deflectable retention arm 17 which is attached to the upper face of the inner flange 11 and has a remote end section 171 engaging the planetary gear 14. In this respect, the planetary gear 14 is sized so as to have a portion thereof extending beyond the upper face of the inner flange 11 for engaging the remote end section 171 of the retention arm 17.

The retention arm 17 is attached to the upper face of the inner flange 11 by any known means. For example and as shown in the drawings, a resilient loop 172 is formed on an end of the arm 17 opposite to the remote end section 171. A plurality of projections 15 are formed on the upper face of the inner flange 11 over which the loop 172 is tightly fit.

A rib 16 is formed on the upper face of the inner flange 11 and extends, along one lateral side of the retention arm 17, between the projections 15 and the circular recess 13 that accommodates the planetary gear 14. Thus, the rib 16 prevents the retention arm 17 from deflection in a direction (inward direction) toward the center of the control ring 10 but allowing the retention arm 17 to be deflected in an opposite direction (outward direction) away from the center of the ring 10. Thus, with the remote end section 171 engaging the planetary gear 14, the planetary gear 14 is allowed to rotate in a given direction, but not in an opposite direction. This is because when the planetary gear 14 is rotated in the given direction, the teeth of the planetary gear 14 drive the remote end section 171 to deflect the retention arm 17 in the outward direction which allows the teeth to pass through the remote end section 171 for rotating the planetary gear 14 in the given direction. When the planetary gear 14 is rotated in the opposite direction, the teeth of the planetary gear 14 attempt to deflect the retention arm 17 in the inward direction that is prohibited by the rib 16. Thus, the retention arm 17 forms a ratchet system that allows the planetary gear 14 to rotate in the given direction, but not in the opposite direction.

Figure 4:
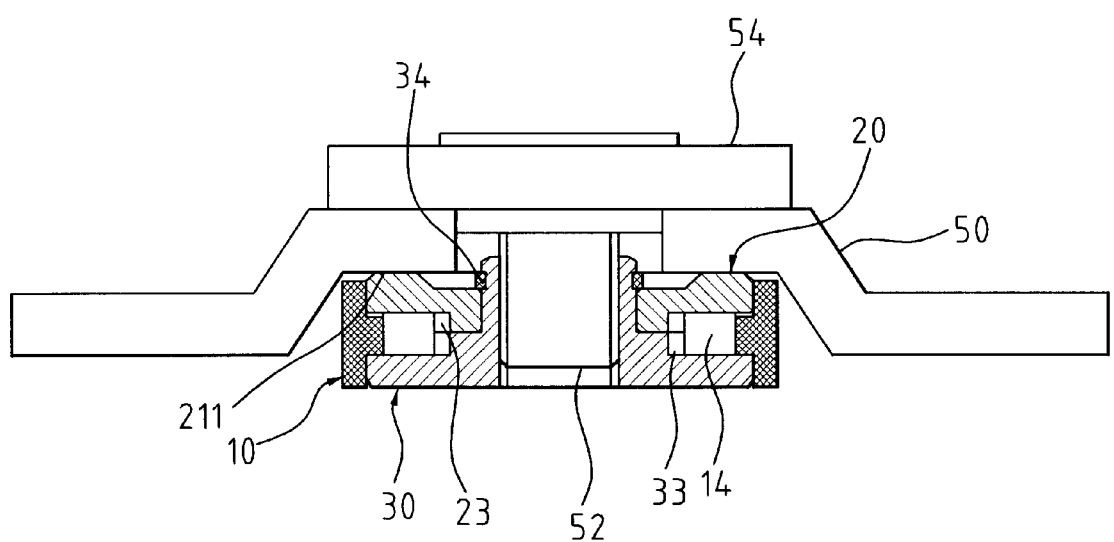
FIG. 4 is a cross-sectional view showing a grinding wheel secured by the nut of the present invention.

With reference to FIG. 4, when the nut of the present invention is employed to secure for example a grinding wheel 50 of a grinding machine, the nut engages a threaded axle 52 of the grinding machine with the grinding wheel 50 securely interposed between the nut and a washer or other fixture 54. The nut is manually mounted to the threaded axle 52 with the high friction face 211 of the cap 20 in physical engagement with the grinding wheel 50. When the grinding machine is actuated, the grinding wheel 50 rotates. The high friction face 211 of the cap 20 causes the cap 20 to rotate with the grinding wheel 50.

Figure 5:
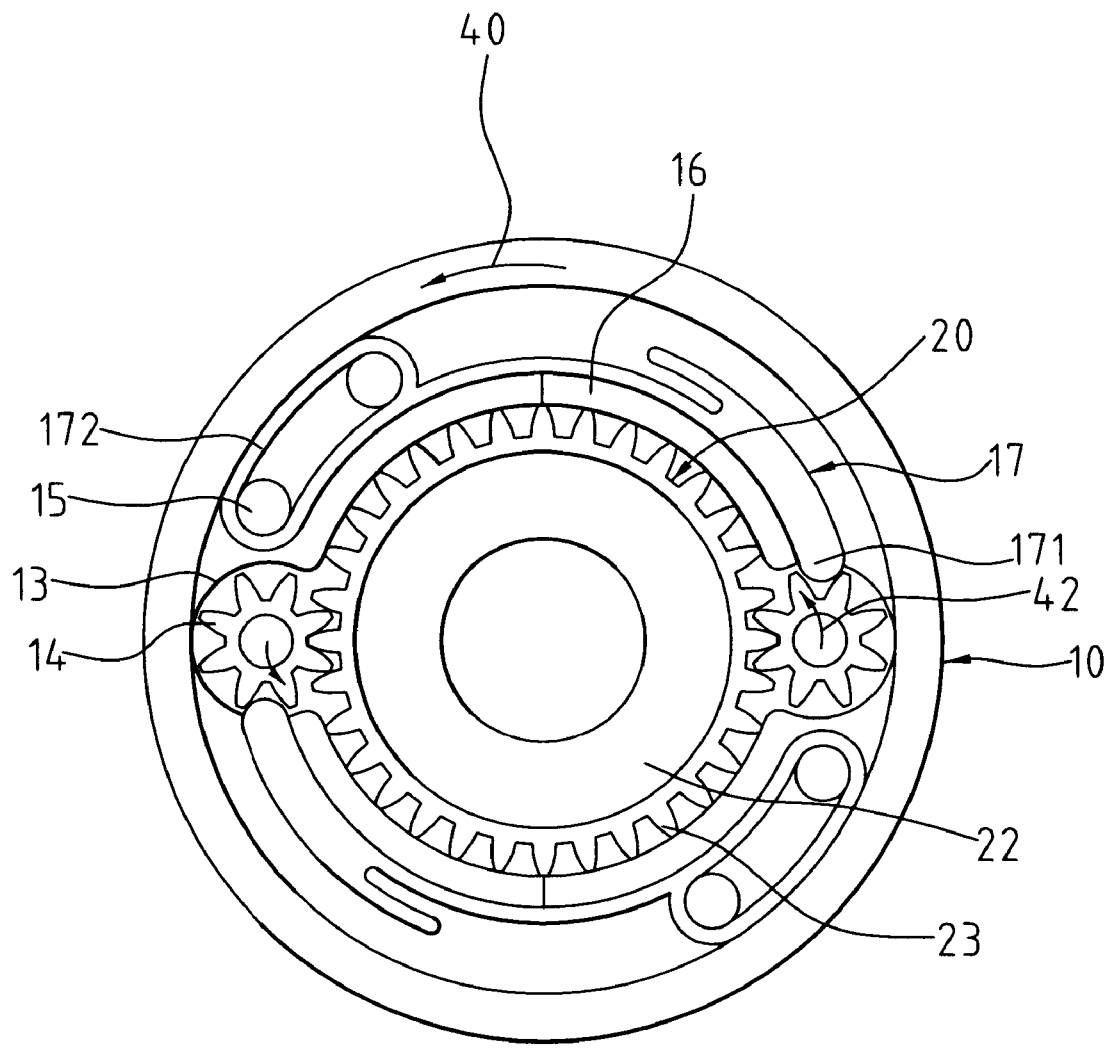
FIG. 5 is a plan view of the nut, with the cap removed, showing an initial tightening operation of the nut.

Also referring to FIG. 5, to manually mount the nut of the present invention to the threaded axle 52, in an initial tightening operation, an operator (not shown) rotates the control ring 10 in for example the direction indicated by arrow 40. The planetary gears 14 are driven to orbit about the sun gears 23, 33 with the control ring 10. With the engagement with the sun gears 23, 33, the planetary gears 14 also attempt to rotate about central axes of their own in direction indicated by arrow 42, which in the embodiment illustrated, attempts to deflect the retention arms 17 in the inward direction. The inward deflection of the retention arms 17 is, however, prohibited by the rib 16. As a consequence, the planetary gears 14 are not allowed to rotate about their own axes and thus driving the sun gears 23, 33 to rotate with the control ring 10 and tightening the nut on the threaded axle 52.

Further referring to FIGS. 6, 6A and 6B, under the condition that the nut is initially and manually tightened, when the grinding machine is actuated and the axle 52 starts to rotate, a relative rotation occurs between the grinding wheel 50 and the axle 52 (due to the loose engagement between the nut and the axle 52), initiating an advanced tightening operation. The friction between the grinding wheel 50 and the high friction face 211 of the cap 20 causes the cap 20 to rotate with the grinding wheel 50 with respect to the base 30 in the direction indicated by arrow 44. The planetary gears 14 are driven by the second sun gear 23 of the cap 20 in the direction 46. The planetary gears 14, in turn, drive the first sun gear 33 and thus the base 30 to rotate in the same direction as the cap 20, that is the direction of arrow 44. The rotation of the base 30 further tightens the nut on the threaded axle 52. Thus, the nut is securely tightened on the threaded axle 52 even the nut is not securely tightened at the beginning.

The retention arms 17 can be made so that when the remote end sections 171 of the retention arms 17 are hit by teeth of the planetary gears 14, a "tick" sound is generated. Once the nut is completely tightened where the relative rotation between the grinding wheel 50 and the axle 52 is no longer present, the planetary gears 14 no longer rotate and no "tick" sound generated. This provides a sensory indication of complete tightening of the nut.

Figure 7A:
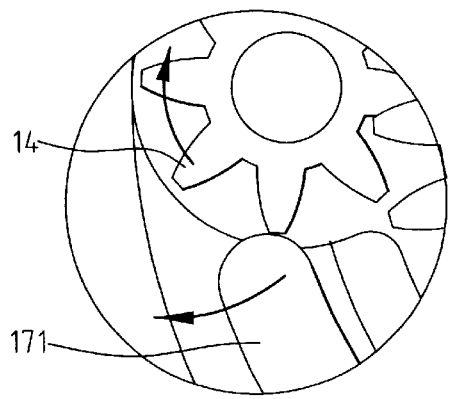
FIG. 7A is an enlarged view of encircled portion 7A of FIG. 7.
Figure 7B:
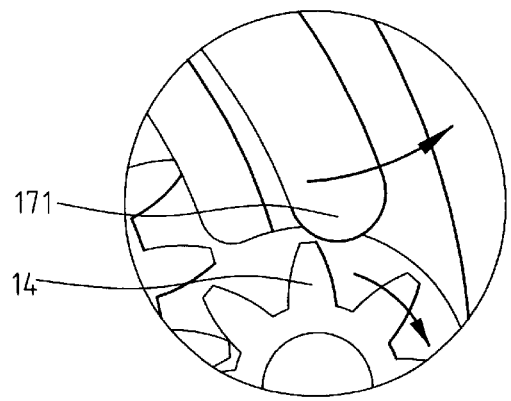
FIG. 7B is an enlarged view of encircled portion 7B of FIG. 7.
Figure 7:
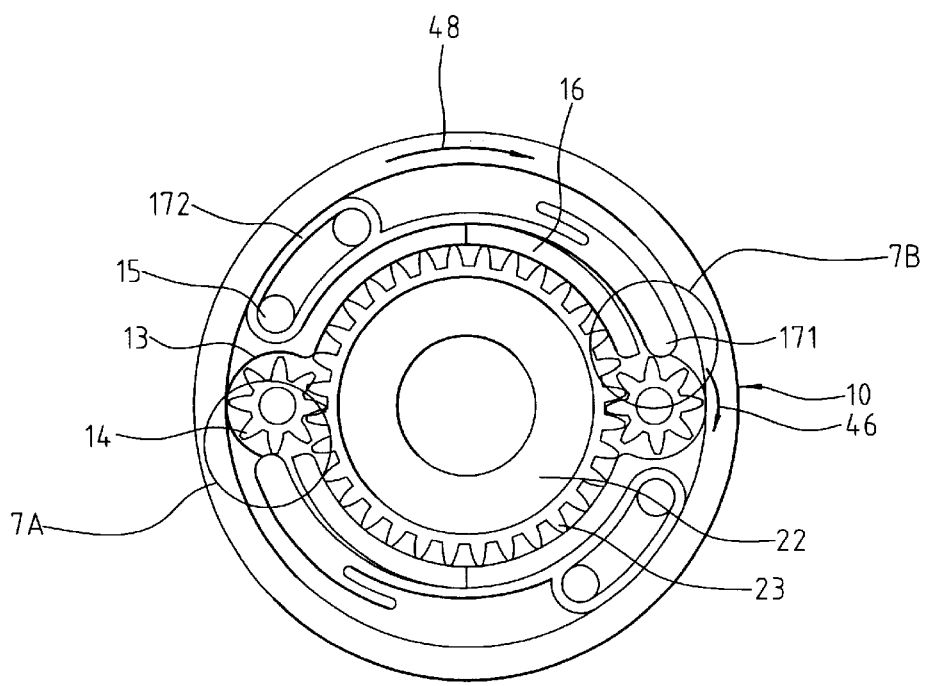
FIG. 7 is a plan view of the nut, with the cap removed, showing a loosening operation of the nut.

Referring to FIGS. 7, 7A and 7B, to loosen and remove the nut, the operator manually rotates the control ring 10 in an opposite direction indicated by arrow 48. The planetary gears 14 are driven to orbit about the central axis of the control ring 10. The planetary gears 14 also attempt to rotate about their own central axes in the direction indicated by arrow 46 by deflecting the retention arms 17 in the outward direction. The second sun gear 23 of the cap 20 is, however, fixed, due to the friction engagement between the upper face 211 of the cap 20 and the grinding wheel 50. Thus, when the control ring 10 makes a full turn, the planetary gears 14 make a full turn around the second sun gear 23. Due to the difference in tooth numbers between the first and second sun gears 33, 23, the first sun gear 33 of the base 30 is allowed to rotate with the planetary gears 14. Since the tooth number of the first sun gear 33 is greater than the that of the second sun gear 23, the first sun gear 33 and thus the base 30 is rotated in the same direction as the control ring 10 with a significant reduction of speed therebetween. The reduction of speed of the first sun gear 33 magnifies the torque applied to the base 30 by the control ring 10. Thus, the base 30 can be loosened readily with a small torque applied to the control ring 10.

Taking the assumption that the first sun gear 33 has thirty two teeth and the second sun gear 23 has thirty teeth as discussed above, the torques acting upon the second and first sun gears 23, 33, representing by T1 and T2, have the following relationship:

$$T1 \times (30/30) = T2 \times (2/32)$$

which implies that T2=16 T1. A remarkable reduction in the torque required to release the nut can be obtained.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A nut comprising:

a first member forming a first sun gear having a first number of teeth surrounding a cylinder defining a first, inner-threaded bore, the first sun gear having a nominal diameter;

a second member forming a second sun gear having a second number of teeth surrounding a second bore rotatably fit over the cylinder of the first member with the second sun gear facing the first sun gear, the second sun gear having a nominal diameter identical to the nominal diameter of the first sun gear;

a control ring rotatably surrounding the first and second sun gears and rotatably retaining a planetary gear having teeth engaging the teeth of both the first and second sun gears; and ratcheting means for engaging the teeth of the planetary gear to allow the planetary gear to rotate in a predetermined first angular direction and to prevent the planetary gear from rotation in an opposite second angular direction.

2. The nut as claimed in claim 1, wherein the second member comprises a second disk having an inner surface facing the first member, a hub being formed on the inner surface of the second disk and defining the central bore, the teeth of the second sun gear being formed around the hub.

3. The nut as claimed in claim 1, wherein the first member comprises a first disk having an inner surface facing the second member, the cylinder being formed on the inner surface and extending through the central bore of the second member, the teeth of the first sun gear being formed around the cylinder.

4. The nut claimed in claim 1, wherein the cylinder of the first member extends through the central bore of the second member and having a free end projecting beyond an outer surface of the second member, a circumferential groove being defined in the free end of the cylinder for receiving a C-ring to retain the second member on the cylinder of the first member.

5. The nut as claimed in claim 1, wherein the control ring comprises a circumferential flange defining a circular recess rotatably accommodating the planetary gear.

6. The nut as claimed in claim 1, wherein the control ring comprises an outer wall surrounding the first and second members, flutes being defined in and spaced along the outer wall for enhancing hand gripping.

7. The nut as claimed in claim 1, wherein the ratcheting means comprises a deflectable arm having a first end attached to the control ring and an opposite second end engaging the teeth of the planetary gear, a rib being formed on the control ring and extending along one lateral side of the deflectable arm whereby the rotation of the planetary gear in the first angular direction deflects the deflectable arm away from the rib, and whereby an attempt to rotate the planetary gear in the second angular direction is prohibited by the rib extending along the lateral side of the deflectable arm.

8. The nut as claimed in claim 7, wherein the first end of the deflectable arm forms a resilient loop tightly fit over a plurality of projections formed on the control ring.

9. The nut as claimed in claim 1, wherein the inner-threaded bore of the first member is adapted to threadingly engage a threaded driving axle of a rotary device by manually rotating the control ring in such a direction that the planetary gear is not allowed to rotate but orbiting about the first sun gear, thereby driving the first sun gear to loosely tighten the first member on the threaded axle, and wherein the second member has an outer surface having a high friction coefficient adapted to frictionally engage a rotatable member of the rotary device that is to be driven by the threaded axle for securing the rotatable member to the threaded axle, wherein rotation of the rotatable member causes the second member to rotate therewith by means of the friction engagement therebetween, the second sun gear driving the planetary gear which in turn drives the first sun gear to further tighten the first member on the threaded axle.

10. The nut as claimed in claim 9, wherein the second number of the teeth of the second sun gear is smaller than the first number of the teeth of the first sun gear whereby when the control ring is rotated in a direction to release the nut from the threaded axle, a reduction in rotational speed is obtained between the control ring and the first member for enhancing loosening the first member from the threaded axle.

11. The nut as claimed in claim 1, wherein the second number is different from the first number for speed reduction purposes.

12. The nut as claimed in claim 11, wherein the second number is smaller than the first number.

13. The nut as claimed in claim 1, wherein the control ring comprises two planetary gears diametrically opposite to each other.

14. The nut as claimed in claim 9 further comprising means for generating sensory indication when the second member is rotated with the rotatable member of the rotary device to further tighten the first member.

15. The nut as claimed in claim 14, wherein the loose tightening between the first member and the threaded axle of the rotary device leads to relative rotation between the rotatable member and the axle, the rotation of the second member with the rotatable member causing the deflectable arm to be repeatedly hit by the teeth of the planetary which gives off consecutive sounds until the first member is completely tightened on the threaded axle which leads no relative rotation between the rotatable member and the threaded axle of the rotary device.

* * * * *